(12) United States Patent
Elliott et al.

(10) Patent No.: US 10,673,091 B2
(45) Date of Patent: Jun. 2, 2020

(54) FUEL CELL AND BATTERY

(71) Applicant: Intelligent Energy Limited, Loughborough (GB)

(72) Inventors: Zachary Elliott, Loughborough (GB); Nathan Grange, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 289 days.

(21) Appl. No.: 15/519,121

(22) PCT Filed: Oct. 13, 2015

(86) PCT No.: PCT/GB2015/053011
§ 371 (c)(1),
(2) Date: Apr. 13, 2017

(87) PCT Pub. No.: WO2016/059393
PCT Pub. Date: Apr. 21, 2016

(65) Prior Publication Data
US 2017/0229729 A1 Aug. 10, 2017

(30) Foreign Application Priority Data
Oct. 15, 2014 (GB) .................................... 1418271.1

(51) Int. Cl.
*H01M 8/241* (2016.01)
*H02J 1/10* (2006.01)
*H01M 16/00* (2006.01)

(52) U.S. Cl.
CPC ......... *H01M 8/241* (2013.01); *H01M 16/003* (2013.01); *H01M 16/006* (2013.01); *H02J 1/108* (2013.01); *H02J 2300/30* (2020.01)

(58) Field of Classification Search
CPC ...... H01M 8/241; H01M 8/24; H01M 16/003; H01M 16/006; H02J 1/108; H02J 2001/004
See application file for complete search history.

(56) References Cited

U.S. PATENT DOCUMENTS

| 3,443,115 | A | 5/1969 | Timmerman |
| 6,580,977 | B2 * | 6/2003 | Ding ..................... B60L 58/34 |
| | | | 701/22 |

(Continued)

FOREIGN PATENT DOCUMENTS

| EP | 1713143 | 10/2006 |
| JP | S44-018250 B1 | 8/1969 |

(Continued)

OTHER PUBLICATIONS

International Search Report and Written Opinion in International Patent Application No. PCT/GB2015/053011 dated Dec. 11, 2015.

*Primary Examiner* — Amy Cohen Johnson
*Assistant Examiner* — Paul D Baillargeon
(74) *Attorney, Agent, or Firm* — Baker Hostetler, LLP

(57) ABSTRACT

A fuel cell assembly in combination with an electrochemical battery, having an electrical connection therebetween, the electrical connection including a current blocking element to prevent current stored in the battery from flowing into the fuel cell assembly and wherein the electrical connection is absent of a current control component for current generated by the fuel cell assembly flowing to the battery.

11 Claims, 2 Drawing Sheets

(56) References Cited

U.S. PATENT DOCUMENTS

| | | | |
|---|---|---|---|
| 2002/0095247 A1 | 7/2002 | Ding et al. | |
| 2003/0111908 A1 | 6/2003 | Christensen | |
| 2004/0033398 A1 | 2/2004 | Kearl et al. | |
| 2006/0238033 A1 | 10/2006 | Raiser et al. | |
| 2007/0092763 A1* | 4/2007 | Ouchi | H01M 16/006 429/9 |
| 2012/0019190 A1 | 1/2012 | Jones | |
| 2016/0141896 A1* | 5/2016 | Brandon | H01M 16/003 307/72 |

FOREIGN PATENT DOCUMENTS

| | | |
|---|---|---|
| JP | 2002-324562 A | 11/2002 |
| JP | 2004-079537 A | 3/2004 |
| JP | 2007-066757 A | 3/2007 |
| JP | 2007-244179 A | 9/2007 |
| JP | 2008-538650 A | 10/2008 |

* cited by examiner

FUEL CELL AND BATTERY

CROSS-REFERENCE TO RELATED APPLICATIONS

This patent application is a National Stage Application of international patent application PCT/GB2015/053011 filed Oct. 13, 2015, which claims priority to Great Britain patent application 1418271.1, filed Oct. 15, 2014, the disclosures of which are incorporated by reference in their entirety.

This invention relates to a fuel cell in combination with a battery, such as an electrochemical battery. It also relates to a plurality of individual fuel cells arranged in a stack or a planar array having configurable or reconfigurable interconnections between at least some of the fuel cells. The invention also relates to an interconnection controller configured to reconfigure electrical interconnections between a plurality of the fuel cells.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) exchange membrane (PEM), with fuel and air being passed over respective sides of the membrane. Protons (that is, hydrogen ions) are conducted through the PEM, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together face to face by end plates at either end of the stack.

In an alternative configuration, the fuel cells may be arranged in a planar or laminar array; side by side, rather than face to face, to form, for example a substantially laminar sheet.

According to a first aspect we provide a fuel cell assembly in combination with an electrochemical battery, having an electrical connection therebetween, the electrical connection including a current blocking element to prevent current stored in the battery from flowing into the fuel cell assembly and wherein the electrical connection is absent of a current control component for current generated by the fuel cell assembly flowing to the battery.

This is advantageous as the fuel cell is protected from an over voltage from the battery, but the component count can be reduced by not providing any current control for current flowing from the fuel cell to the battery.

Optionally, the electrical connection is absent of a current control component comprising a DC-DC convertor. Optionally, the electrical connection is absent of a current control component configured to apply a cut-off limit on the current flow from the fuel cell assembly to the battery. Thus, the electrical connection does not include active current control that uses a measured quantity of the fuel cell assembly, battery or a combination to control the current.

Optionally, the maximum open circuit voltage of the fuel cell assembly is configured to be less or equal to the battery's maximum output voltage. This is advantageous as the fuel cell assembly itself is configured to match the parameters of the battery such that the battery is protected from excessive voltages without current control.

Optionally, the maximum open circuit voltage of the fuel cell assembly is less than a threshold voltage equal to 10% greater than the battery's maximum output voltage. Alternatively the threshold may be 5%, 2% or 1% greater than the battery's maximum output voltage. The use of a threshold is advantageous as the open circuit voltage output of the fuel cell will be greater than that experienced with the fuel cell assembly is under load.

Optionally, the fuel cell assembly is configured to provide a current output at the full power of the fuel cell assembly, less than or equal to a current capable of meeting the C rate of the battery when the battery is operating at its operational lower voltage limit. Thus, the current output of the fuel cell may be up to a maximum current defined by the c-rate*maximum battery capacity.

Optionally, all of the fuel cells in the assembly are of the same electrochemical type.

Optionally, the fuel cell assembly comprises at least two fuel cells, each fuel cell in the fuel cell assembly having an anode and a cathode to provide for electrical interconnections with other fuel cells of the assembly or assembly output terminals wherein the electrical interconnections between a plurality of the fuel cells of the fuel cell assembly are reconfigurable such that said plurality of fuel cells or a subset thereof are connectable in at least two of;
  i) in series with another fuel cell of the assembly;
  ii) in parallel with another fuel cell of the assembly; or
  iii) disconnected from the assembly.

Optionally, the fuel cell assembly includes an interconnection controller configured to actively reconfigure the interconnections in use.

Optionally, the interconnection controller is configured to actively arrange the interconnections between the fuel cells such that the number of fuel cells in series provides the maximum open circuit voltage of the fuel cell assembly is configured to be less or equal to the battery's maximum output voltage.

Optionally, the interconnection controller is configured to actively arrange the interconnections between the fuel cells such that the number of fuel cells in parallel provides a current output at the full power of the fuel cell assembly, less than or equal to a current capable of meeting the C rate of the battery when the battery is operating at its operational lower voltage limit.

Optionally the interconnections controller is configured to actively arrange the interconnections between the fuel cells to control the area of a contiguous group of cells arranged in parallel to provide a current output at the full power of the fuel cell assembly, less than or equal to the C rate of the battery when the battery is operating at its operational lower voltage limit.

According to a second aspect of the invention we provide a fuel cell assembly in combination with an electrochemical battery, having an electrical connection therebetween, the electrical connection comprising a switch configured to control the current generated by the fuel cell assembly flowing to the battery, the switch configured to prevent current flow when a voltage output of the fuel cell assembly is greater than a maximum voltage of the battery and wherein operation of said switch is independent of the instantaneous battery voltage or changes therein.

This is advantageous as the control of the current flowing between the fuel cell and the battery is straightforward and cost-effective. The cut-off switch provide a robust means for protecting the battery from a voltage produced by the fuel cell that is above the maximum operating voltage of the battery, which is specified by the manufacturer.

Optionally, the electrical connection includes a current blocking element to prevent current stored in the battery from flowing into the fuel cell assembly. Thus, a further robust component is provided to protect the fuel cell assembly from receiving current from the battery.

Optionally, the switch is configured to allow current flow without modulation when a voltage output of the fuel cell assembly is less than a maximum voltage of the battery. This is advantageous as the switch does not need to perform any modulation to match the voltage of the fuel cell to the voltage of the battery. Optionally, the switch has a switching frequency of less than 0.5 Hz or less than 0.1 Hz. Thus, the switch acts as a cut-off switch rather than time modulating the voltage.

Optionally, the fuel cell assembly is configured to provide a current output at the full power of the fuel cell assembly, less than or equal to a current capable of meeting the C rate of the battery when the battery is operating at its operational lower voltage limit.

Optionally, the fuel cell assembly comprises at least two fuel cells, each fuel cell in the fuel cell assembly having an anode and a cathode to provide for electrical interconnections with other fuel cells of the assembly or assembly output terminals wherein the electrical interconnections between a plurality of the fuel cells of the fuel cell assembly are configurable such that said plurality of fuel cells or a subset thereof are connectable in at least two of;
   i) in series with another fuel cell of the assembly;
   ii) in parallel with another fuel cell of the assembly; or
   iii) disconnected from the assembly.

Optionally, the fuel cell assembly includes a controller configured to actively reconfigure the interconnections in use.

Optionally, the controller is configured to actively arrange the interconnections between the fuel cells such that the number of fuel cells in parallel provides a current output at the full power of the fuel cell assembly, less than or equal to a current capable of meeting the C rate of the battery when the battery is operating at its operational lower voltage limit.

Optionally, the controller is configured to actively arrange the interconnections between the fuel cells to control the area of a contiguous group of cells arranged in parallel to provide a current output at the full power of the fuel cell assembly, less than or equal to a current capable of meeting the C rate of the battery when the battery is operating at its operational lower voltage limit.

According to a third aspect of the invention, we provide a fuel cell assembly in combination with an electrochemical battery, wherein the fuel cell assembly is configured such that;
   the maximum open circuit voltage of the fuel cell assembly is less or equal to a threshold voltage related to the maximum output voltage of the battery; and/or
   a current output at the full power of the fuel cell assembly is less than or equal to a current capable of meeting the C rate of the battery when the battery is operating at its operational lower voltage limit.

Optionally, the threshold voltage comprises a voltage equal to the battery's maximum output voltage.

Optionally, the threshold voltage comprises a voltage 10%, 5%, 2% or 1% greater than the battery's maximum output voltage. This may compensate for difference between the voltage output of the fuel cell when the fuel cell is connected to a load and its open circuit voltage.

Optionally, an electrical connection connects the fuel cell and battery and wherein the electrical connection includes a current blocking element to prevent current stored in the battery from flowing into the fuel cell assembly and wherein the electrical connection is absent of a current control component for current generated by the fuel cell assembly flowing to the battery.

There now follows, by way of example only, a detailed description of embodiments of the invention with reference to the following figures, in which.

Figure 1:
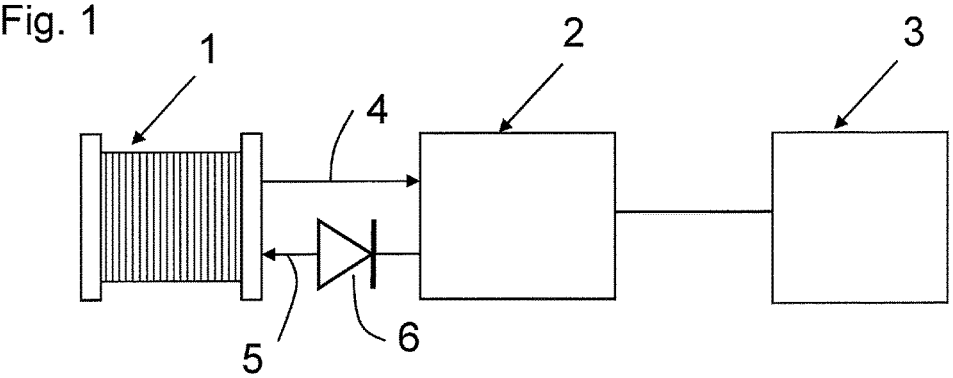
FIG. 1 shows a schematic diagram of a fuel cell assembly in combination with a battery, the combination shown powering a load.

FIG. 1 shows a schematic diagram of a fuel cell assembly 1 in combination with a battery 2. The fuel cell assembly 1 and battery form a hybridised power source for a load 3. In this example, the fuel cell assembly 1 comprises a plurality of fuel cells arranged in a stack. However, it will be appreciated that the fuel cell assembly 1 may comprise a planar or laminar fuel cell assembly 1 in which the fuel cells are arranged side by side rather than face to face. The battery comprises an electrochemical battery, such as a Lithium-Ion battery. The battery 2 may be formed of one or more battery cells.

FIG. 1 shows an electrical connection 4, 5 between the fuel cell assembly 1 and the battery 2. The electrical connection 4, 5 extends directly from output terminals of the fuel cell assembly to terminals of the battery 2. The electrical connection is represented by arrow 4 and arrow 5, which represent power flow between the fuel cell assembly 1 and battery 2. It will be appreciated that the arrows 4, 5 are schematic rather than representing the physical connection. Arrow 4 shows power flow in the direction from the fuel cell assembly 1 to the battery 2 and therefore power generated by the fuel cell assembly 1 can charge the battery 2 and/or power the load 3. Arrow 5 shows power flow in the direction of the battery 2 to the fuel cell assembly 1. The electrical connection 4, 5 includes a current blocking element 6, which in this example comprises a diode, to prevent current stored in the battery 2 from flowing into the fuel cell assembly 1.

The electrical connection 4, 5 is absent of a current control component for current generated by the fuel cell assembly flowing to the battery. Thus the electrical connection 4, 5 provides no active restriction on current flow from the fuel cell assembly 1 to the battery 2, other than the inherent resistance of the electrical connection. This arrangement is advantageous as it provides for cost effective hybridisation without the need for a DC-DC convertor or electrical elements to provide a cut-off limit on the current flow from the fuel cell assembly 1 to the battery 2.

The fuel cell assembly 1 may generate a range of voltages. The battery 2 will also have a range of operating voltages, which may be dependent on its charge state. The operating voltage range of a battery 2 is determined by its electrochemistry and design among other factors. A battery manufacturer will state the operating voltage range of the battery as a maximum operating voltage and a minimum operating voltage. For example, a typical Lithium-Ion battery has an operating voltage range of 3V-4.2 V, which is specified by the manufacturer.

It is important to ensure that the range of voltages generated by the fuel cell assembly 1 is compatible with the battery 2 given that the arrangement is absent of current control between the fuel cell assembly 1 and the battery 2. It is therefore advantageous to match the performance of the fuel cell assembly 1 to the operating voltage range of the battery 2 with which it is hybridised. Nevertheless it will be appreciated that the matching of the fuel cell output parameters to the operating range of the battery as described below may be performed independently of the provision or absence of current flow control between the fuel cell assembly and battery in either direction.

In particular, the maximum, open circuit, voltage of the fuel cell assembly 1 may be configured to be less than or equal to the manufacturer specified maximum operating voltage of the battery 2. The voltage output of a fuel cell assembly 1 may be determined by the number of individual fuel cells (in the stack configuration or planar configuration) that are arranged in series. For a typical Proton Exchange Membrane (PEM) based fuel cell an individual cell may provide an open circuit voltage (i.e. when not powering a load) of 0.6 V. Thus, seven fuel cells arranged in series each having an output of 0.6 V will provide a voltage of 4.2 V, which matches the maximum operating voltage of a Lithium-Ion battery 2. Thus, the maximum voltage performance of the fuel cell assembly 1 may be selected to ensure that despite the provision of no current control for current flowing between the fuel cell assembly 1 and the battery 2 there is no damage to the battery 2 through charging it at a voltage greater than its maximum operating voltage. It is assumed that the individual cells are of the same type and therefore output a similar maximum voltage, although it will be appreciated that different cell types could form the assembly 1.

In other embodiments, the maximum open circuit voltage of the fuel cell assembly 1 may be selected to be less than a threshold voltage equal to 10% greater than the manufacturer specified maximum output voltage of the battery. The threshold may alternatively be 5% or 2% or 1% greater than the manufactures maximum output voltage of the battery. By setting the fuel cell assembly's maximum potential output voltage greater than the battery's operating voltage, it is possible that the battery may be charged at too great a voltage and damage may occur to the battery. However, the use of the threshold may ensure that the voltage output of the fuel cell assembly 1 is only marginally greater that the battery's maximum voltage and perhaps within manufacturer's tolerances. Also, the use of a threshold allows for the voltage drop of the fuel cell assembly when powering a load rather than its open circuit voltage to be accommodated. Accordingly, the threshold may be determined based on the load characteristics (voltage drop vs load) of the fuel cell assembly 1. The threshold, which is predetermined and fixed, may be selected to ensure that in use the voltage applied by the fuel cell assembly 1 to the battery 2 does not exceed the maximum operating voltage of the battery 2.

The matching of the fuel cell assembly's 1 performance to the battery's operating voltage range may be advantageous. In a further embodiment, a performance characteristic of the fuel cell assembly 1 is set at the minimum operating voltage of the battery 2.

The fuel cell assembly 1 may be configured to provide a current output at the full power of the fuel cell assembly, less than or equal to a current that satisfies the C rate of the battery when the battery is operating at its operational lower voltage limit. Thus, with the battery 2 operating at its lower voltage limit as specified by the manufacturer, which may be 3 V for a typical Li-Ion battery, the fuel cell assembly is configured to output a current sufficient to satisfy the C rate of the battery, when the fuel cell assembly 1 itself is operating at its maximum load. The C rate is a manufacturer specified battery parameter. Thus, the current output of the fuel cell may be up to a maximum current defined by the c-rate*maximum battery capacity. The C rate specifics the rate at which a battery may be charged and can be used to specify a performance characteristic of the fuel cell assembly 1 for efficient hybridisation.

Thus, at full load of the fuel cell, which may be achieved with sufficient fuel to prevent fuel starvation and sufficient available oxidant, the fuel cell assembly is configured to provide a current less than or equal to the "C-rate current" of the battery. Thus, the fuel cell assembly is configured such that when the maximum output voltage of the fuel cell assembly 1, given its load or in open circuit, is applied to the battery, with the battery operating at its minimum voltage range value, the current output meets the C rate requirement of the battery. The current output of a fuel cell assembly 1 may be associated with the area of the active area of the fuel cells or of a group of cells arranged in electrical parallel in the assembly 1.

Thus, in one embodiment, with each individual fuel cell having an area less than that required to meet the C-rate at the specified voltages, the fuel cell assembly 1 is configured by electrically connecting a number of the fuel cells of the assembly 1 together in parallel such that the current output of the fuel cell assembly is equal to or less than a current to meet the C rate. Thus, the largest area parallel arrangement of cells in the assembly 1 may by formed to provide the required current at the minimum battery voltage. Thus, while there may be several groups of fuel cells in parallel arrangements, with the parallel arrangements connected in series, for example, it is predominately the parallel arrangement with the largest active area that determines the maximum current output of the fuel cell assembly 1 as a whole. Accordingly, the area of the largest contiguous group of cells in a parallel arrangement is configured to provide a current corresponding to the C rate of the battery.

For example, for a battery having a C rate of 2 and a having a maximum capacity of 4.4 Ah, a maximum current of 8.8 Amps may be required to be output by the fuel cell assembly at the lower operating battery voltage. The maximum battery capacity is also a manufacturer specified parameter of the battery. Thus, the current output of the fuel cell may be up to a maximum current defined by the c-rate*maximum battery capacity; 2*4.4 Ah.

The matching of fuel cell performance characteristics to a particular battery with which it is to be hybridised is advantageous as it can provide an efficient combination and obviate the need for current control between the fuel cell assembly and battery.

Providing a fuel cell assembly topology that is configurable is advantageous. In particular, a topology having configurable electrical interconnections between physically fixed fuel cells would be advantageous. The fuel cell assembly may comprise a fuel cell stack having insulating plates at positions along the stack dividing it into a plurality of stack sections which can be connected together in series, or parallel or disconnected or combinations thereof. The stack section may include one, two, or more individual fuel cells (fundamentally comprising a membrane electrode assembly). The fuel cell assembly may comprise a laminar fuel cell wherein the fuel cells are arranged in a planar or flat arrangement. The interconnections between the cells may be configurable. Thus, a configurable fuel cell assembly may be provided having a plurality of un-made or reconfigurable electrical interconnections. A battery may be selected for hybridisation (i.e. form a combined power source for a load) and the fuel cell assembly 1 may be configured by selecting its interconnections to provide the required voltage at the battery's stated maximum operating voltage and the required current at the battery's stated minimum operating voltage, as discussed above. As the fuel cell assembly parameters are derived from battery manufacture specified data, the interconnections can be configured based on the battery with which it is desired the fuel cell assembly operates.

Figure 2:
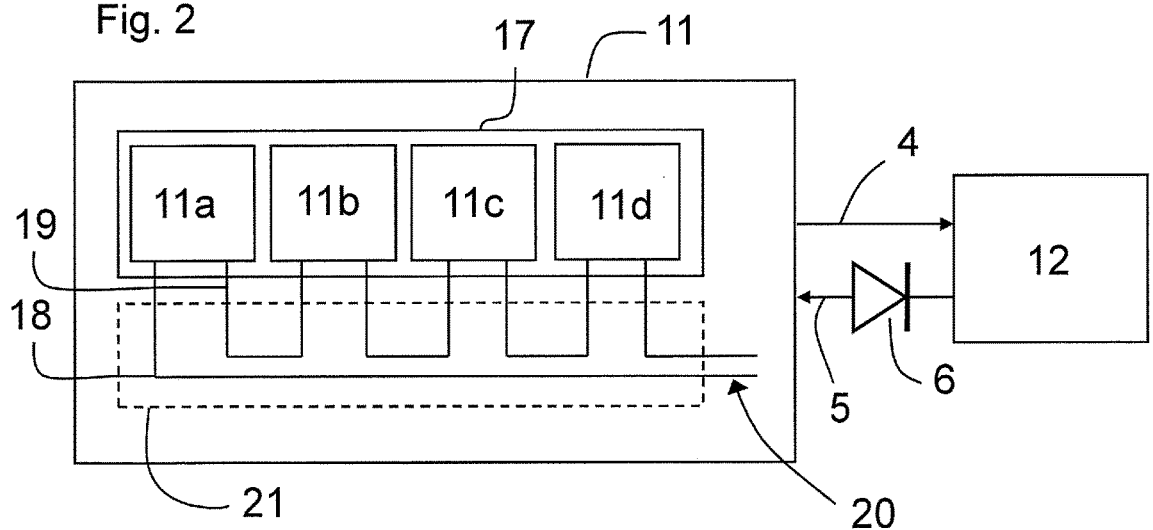
FIG. 2 shows a section through an example fuel cell assembly.

FIG. 2 shows a fuel cell assembly 11 connected to a battery 12 by an electrical connection 14, 15, similar to the arrangement shown in FIG. 1. The fuel cell assembly comprises a planar or laminar assembly rather than the stack shown in FIG. 1 and the load 3 is not shown for clarity. The fuel cell assembly 11 comprises a plurality of fuel cells. In this embodiment, four fuel cells 11a, 11b, 11c and 11d are arranged in a planar array 17. Each fuel cell 11a, 11b, 11c, 11d includes an anode terminal 18 and a cathode terminal 19 extending from the anodes and cathodes of the cells themselves. The anode and cathode terminals provide for electrical connections to other cells of the assembly 11 and/or to provide an output 20 of the assembly 11. The interconnections between the cells and the output 20 are shown by dashed box 21. The dashed box may represent a configurable arrangement of terminals in which jumpers may be used to form the desired interconnections. Alternatively, the interconnections may be formed by a plurality of transistors or other switching element that can control the interconnections between fuel cells. The transistors may be distributed over the assembly 1 or comprise a centralised switching controller. In a further embodiment, the configurable interconnections 21 may be formed by a plurality of switches, such as microswitches, to switch the fuel cells 11a, 11b, 11c and 11d into series, parallel or disconnected configurations.

In FIG. 2, the interconnections 21 are shown in a series arrangement in which the interconnections are such that all of the cells 11a, 11b, 11c, 11d are electrically connected together in series. The voltage provided at the output 20 is thus the sum of the individual fuel cell voltages. The voltage is applied to the electrical connection 4.

Figure 3:
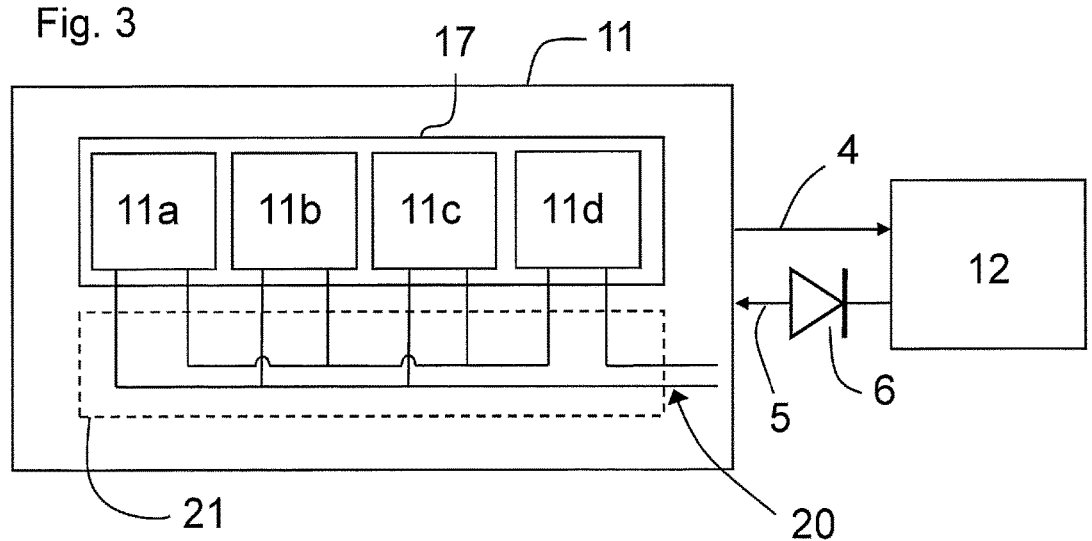
FIG. 3 shows a section through a second example fuel cell assembly.

FIG. 3 shows the interconnections 21 in a different example arrangement. In FIG. 3, the first three fuel cells 11a, 11b, 11c are shown arranged in electrical parallel. This contiguous parallel group is further connected with the fourth fuel cell 11d in series and the voltage of the parallel group 11a, 11b, 11c plus the voltage of the series fuel cell 11d is applied to the output 20. The contiguous parallel group 11a, 11b, 11c forms the largest parallel arrangement of this example assembly and therefore the combined area of the cells within the parallel group 11a, 11b, 11c will define the maximum current output by the assembly 11 (which can be matched to the C rate current of the battery). For efficiency it may be advantageous for an assembly having multiple, separate parallel groups, that each group has substantially the same total cell area. Thus, the fuel cells of an assembly may be arranged in parallel groups comprising substantially the same number of fuel cells, with the groups arranged in series.

It will be appreciated that the configurable electrical interconnections 21 provide a topology that enables the electrical output of a fuel cell assembly having a fixed spatial configuration of fuel cells to be selected post manufacture. This is advantageous for hybridisation with different battery types, such as those found in different consumer electronic devices.

The interconnections 21 may be reconfigurable by way of a switch array (represented by interconnections 21) which can be actuated to electrically connect the fuel cells of the assembly in at least two of series, parallel or disconnected configurations. An interconnection controller may be configured to reconfigure an array of transistors to form the interconnections. The interconnections 21 may be actively reconfigurable such that a controller is configured to change the interconnections between fuel cells while the fuel cell assembly 11 is in use.

Figure 4:
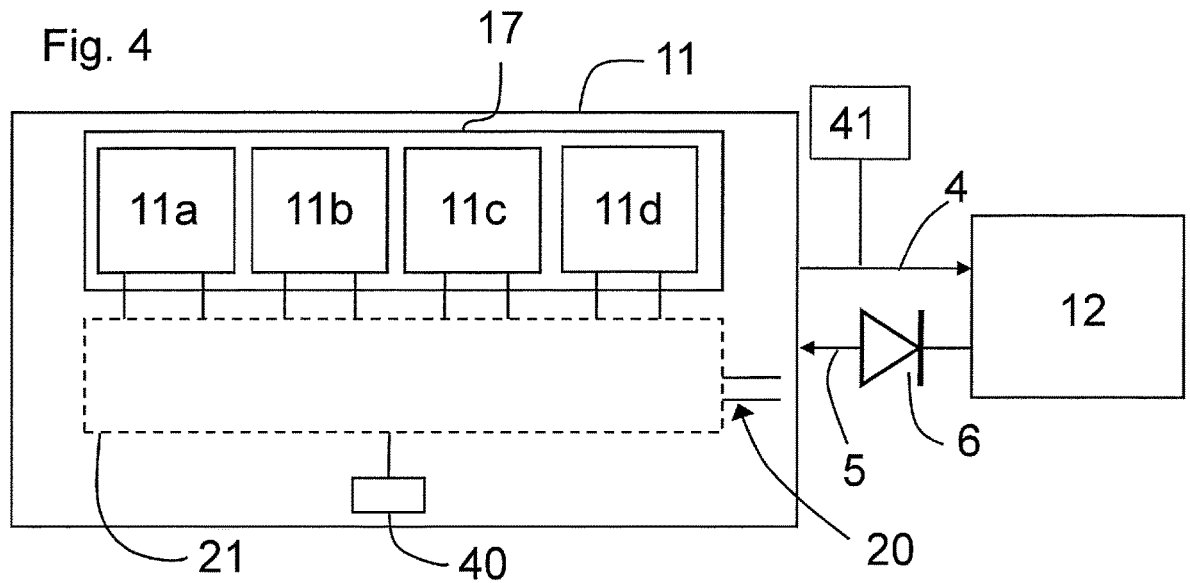
FIG. 4 shows a schematic diagram of a further example of a fuel cell assembly in combination with a battery.

FIG. 4 shows a reconfigurable switch array 21 and an interconnection controlling controller 40. Thus, the switch array 21 includes a plurality of transistor based switches. The controller is shown as a centralised controller configured to pass control signals to a switch array 21. However, it will be appreciated that the interconnection controller may be centralised or distributed over the switch array. The controller 40 may be configured to control the interconnections to provide different output voltages and/or output currents. The interconnection controller is configured to actively reconfigure the interconnections between cells during operation of the fuel cell assembly.

A DC-DC convertor may be used for hybridising a fuel cell and battery to ensure matching of the voltage between the two power sources. However, the interconnection controller 40 allows for the reconfiguration of the interconnections which controls the electrical output of the assembly and may therefore obviate the need for a DC-DC convertor.

The interconnection controller 40 is programmable such that the interconnections between the fuel cells 11a, 11b, 11c, 11d can be reconfigured as required, such as between series and parallel arrangements or between series and disconnected or between parallel and disconnected. Thus, the interconnection controller may connect the fuel cells 11a, 11b, 11c, 11d in series if a higher voltage is required. The interconnection controller 40 may connect the fuel cells 11a, 11b, 11c, 11d in parallel if a lower voltage but higher current is required. Alternatively, the interconnection controller 40 may disconnect certain fuel cells from contributing to the output of the fuel cell assembly, as required, while the remaining fuel cell(s) are connected in series or parallel. Alternatively, a combination of series, parallel and disconnected configurations may be used to achieve a desired output voltage.

In a further embodiment the interconnection controller 40 includes a fuel cell assembly output sensor 41 configured to measure an electrical output of the fuel cell assembly 11. The interconnection controller 40 may be configured to receive the measure of electrical output and form the interconnections between the fuel cells accordingly. This is particularly advantageous as the power output by a fuel cell can vary with temperature, fuel concentration, fuel cell age and other factors. The interconnection controller 40 provides for control of the power output of the array by interconnecting the plurality of fuel cells in different series or parallel or disconnected configurations or combinations thereof. The granularity of output voltages achieved may be reduced by including more fuel cells in the array. Thus, the interconnection controller 40 may be provided with a target output voltage and configured to, using the measure from the sensor 40, which forms a closed loop feedback arrangement, to actively modify the interconnections between fuel cells while in use to obtain or move towards the target output voltage. The interconnection controller 40 may replace a DC-DC converter commonly used in fuel cell power sources for providing a particular output voltage.

While in this example the interconnection controller 40 is shown as a centralised switch controller, it will be appreciated it may be distributed over the assembly 11 with the network of switching elements. Thus, the switching elements may comprise transistors that connect or disconnect interconnections from each of the electrodes and control signals for the transistors (such as a gate signal) may be provided by the controller.

In other embodiments, the interconnection controller 40 is configured to measure the output voltage of some or all of the fuel cells and reconfigured the interconnections accordingly, such as to provide an appropriate voltage for the battery.

The interconnection controller 40 may be configured to actively arrange the interconnections between the fuel cells such that the number of fuel cells in series provides a voltage less or equal to the battery's maximum output voltage. The interconnection controller 40 may be configured to actively arrange the interconnections between the fuel cells such that the number of fuel cells in parallel provides a current output less than or equal to a current that meets the C rate of the battery when the battery is operating at its operational lower voltage limit. Thus, the interconnection controller may actively change the number of cells in a contiguous parallel group to achieve a combined fuel cell area to provide the required current, as discussed above.

Figure 5:
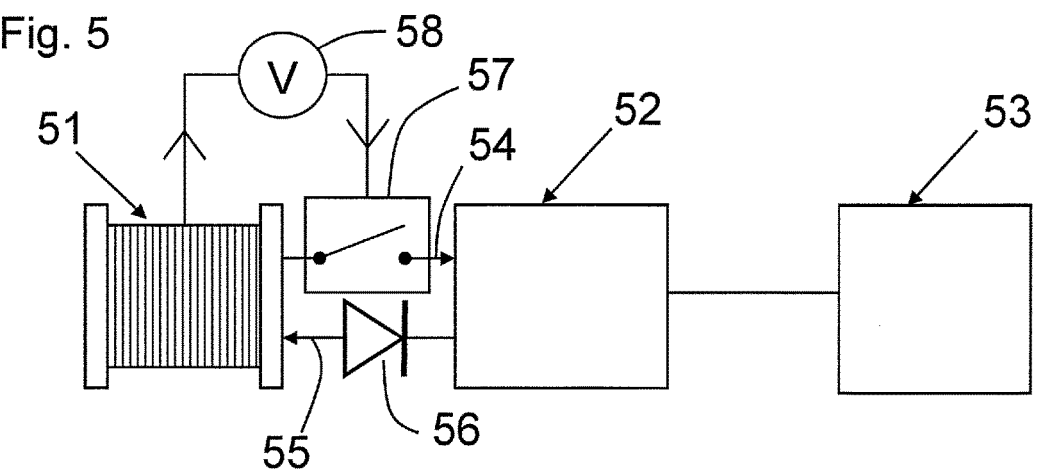
FIG. 5 shows a further embodiment comprising a schematic diagram of a fuel cell assembly in combination with a battery.

FIG. 5 shows a further embodiment comprising a schematic diagram of a fuel cell assembly 51 in combination with a battery 52. The fuel cell assembly 51 and battery form a hybridised power source for a load 53. In this example, the fuel cell assembly 51 comprises a plurality of fuel cells arranged in a stack. However, it will be appreciated that the fuel cell assembly 51 may comprise a planar or laminar fuel cell assembly 51 in which the fuel cells are arranged side by side rather than face to face. The battery comprises an electrochemical battery, such as a Lithium-Ion battery. The battery 52 may be formed of a one or more battery cells.

FIG. 5 shows an electrical connection 54, 55 between the fuel cell assembly 51 and the battery 52. The electrical connection 54, 55 is directly from output terminals of the fuel cell assembly to terminals of the battery 52. The electrical connection is represented by arrow 54 and arrow 55, which represent power flow between the fuel cell assembly 1 and battery 52. It will be appreciated that the arrows 54, 55 are schematic rather than representing the physical connection. Arrow 54 shows power flow in the direction from the fuel cell assembly 51 to the battery 52 and therefore power generated by the fuel cell assembly 51 can charge the battery 52 and/or power the load 53. Arrow 55 shows power flow in the direction of the battery 52 to the fuel cell assembly 51.

The electrical connection 54, 55 includes a current blocking element 56, which in this example comprises a diode, to prevent current stored in the battery from flowing into the fuel cell assembly. The electrical connection also include a current control element 57 for controlling of current flow in the opposite direction from the fuel cell assembly 51 to the battery 52. The current control element 57 comprises a switch, which may be embodied as a transistor. The switch 57 is a cut-off switch configured to prevent current flow based on a threshold being exceeded. In particular, in this embodiment, actuation of the switch 57 is based solely on the voltage output of the fuel cell assembly 51. Thus, a voltage sensor 58 is arranged to measure a voltage output of the whole assembly 51. The sensor 58 may comprise the voltage of the cell applied to a gate terminal of the transistor based switch 57 with the transistor configured to switch on or off based on the voltage applied at its gate terminal.

The switch 57 may include a comparator to compare the measured voltage from the sensor 58 and provide an actuation signal to open switch (and therefore prevent current flow from the fuel cell assembly to the battery) if the measured voltage is greater than a threshold. The threshold may comprise the maximum operating battery voltage as specified by the manufacturer. Thus, while the fuel cell assembly 51 may be capable of providing a voltage greater than the maximum battery voltage, the cut-off switch prevents any damage to the battery by cutting off current to the battery when the fuel cell voltage output exceeds the threshold. When the voltage output of the fuel cell assembly falls below the threshold, the switch 57 may be configured to close.

In other embodiments, a combination of instantaneous fuel cell voltage and rate of change of fuel cell voltage in comparison to a threshold(s) may be used by the switch 57 as an actuation signal. The actuation of the switch 57 is independent of the instantaneous battery voltage and may also be independent of derivatives thereof, such as changes in battery voltage.

The switch 57 may comprise the only current control component configured to control current flow in the fuel cell to battery direction.

It will be appreciated that in this embodiment the switch 57 is configured as a cut-off switch and may include a hysteresis element to prevent a second switch event of the switch 57 following a first switch event. This may prevent the switch 57 oscillating around the threshold. The hysteresis element may wait a predetermined period of time before allowing switching of the switch 57 or may determine when the fuel cell voltage from sensor 58 has changed by a predetermined margin below said threshold.

In other embodiments, the voltage threshold to turn the switch on may be different to the voltage threshold to turn the switch off. For example, the switch off (open switch) voltage may comprise a first threshold, such as the maximum operating voltage of the battery, such that when the fuel cell voltage rises above the maximum battery voltage, the switch 57 opens. The voltage measured by the sensor 58 will then be the open circuit voltage of the fuel cell assembly 41 and may therefore be greater than when the fuel cell assembly is under load. Thus, the switch on voltage (close switch) may comprise a second voltage threshold greater than the first threshold voltage. This assumes a voltage drop in the fuel cell assembly voltage will occur when it is connected to the battery 52 and/or load 53 that will result in fuel cell assembly applying a voltage to the battery 52 that is less than the first threshold voltage. It will be appreciated that other thresholds may be selected. For example the second threshold may be less than the first threshold. The switch 57 is configured to allow current flow without modulation when a voltage output of the fuel cell assembly is less than a maximum voltage of the battery.

The invention claimed is:

1. A fuel cell assembly in combination with an electrochemical battery, having an electrical connection therebetween, the electrical connection including a current blocking element to prevent current stored in the battery from flowing into the fuel cell assembly,
   wherein the electrical connection comprises a switch configured to control the current generated by the fuel cell assembly flowing to the battery, the switch configured to prevent current flow when a voltage output of the fuel cell assembly is greater than a first threshold voltage of the battery, wherein operation of said switch is independent of an instantaneous battery voltage or changes therein;

wherein the cut-off switch includes a hysteresis element to prevent a second switch event following a first switch event, in which the hysteresis element waits a predetermined period of time after the first switch event before allowing the second switch event, and in which the hysteresis element determines when the fuel cell voltage changes by a predetermined margin below the first threshold voltage after the first switch event before allowing the second switch event;

wherein the fuel cell assembly comprises at least two fuel cells, each fuel cell in the fuel cell assembly having an anode and a cathode to provide for electrical interconnections with other fuel cells of the assembly or assembly output terminals, wherein the electrical interconnections between a plurality of the fuel cells of the fuel cell assembly are reconfigurable such that said plurality of the fuel cells or a subset thereof are connectable in at least two of:
  i) in series with another fuel cell of the assembly;
  ii) in parallel with another fuel cell of the assembly; or
  iii) disconnected from the assembly,
wherein the fuel cell assembly includes a controller configured to actively reconfigure the interconnections in use.

2. A fuel cell assembly in combination with an electrochemical battery according to claim 1, in which the switch is configured to allow current flow without modulation when a voltage output of the fuel cell assembly is less than a maximum voltage of the battery.

3. A fuel cell assembly in combination with an electrochemical battery according to claim 1, in which the fuel cell assembly is configured to provide a current output at a full power of the fuel cell assembly, less than or equal to a current capable of meeting a C rate of the battery when the battery is operating at its operational lower voltage limit.

4. A fuel cell assembly in combination with an electrochemical battery according to claim 1, in which the controller is configured to actively arrange the interconnections between the fuel cells such that a quantity of fuel cells in parallel provides a current output at a full power of the fuel cell assembly, less than or equal to a current capable of meeting a C rate of the battery when the battery is operating at its operational lower voltage limit.

5. A fuel cell assembly in combination with an electrochemical battery according to claim 1, in which the controller is configured to actively arrange the interconnections between the fuel cells to control an area of a contiguous group of cells arranged in parallel to provide a current output at a full power of the fuel cell assembly, less than or equal to a current capable of meeting a C rate of the battery when the battery is operating at its operational lower voltage limit.

6. A fuel cell assembly in combination with an electrochemical battery according to claim 1, in which the switch has a switching frequency of less than 0.5 Hz or less than 0.1 Hz.

7. A fuel cell assembly in combination with an electrochemical battery according to claim 1, in which after the switch prevents current flow at the first threshold voltage, the switch is further configured to allow current flow without modulation when a voltage output of the fuel cell assembly is greater than a second threshold voltage.

8. A fuel cell assembly in combination with an electrochemical battery according to claim 1, in which the voltage output of the fuel cell assembly is applied to a gate terminal of the switch and measured by a voltage sensor.

9. A fuel cell assembly in combination with an electrochemical battery, wherein the fuel cell assembly is configured such that
  a maximum open circuit voltage of the fuel cell assembly is less or equal to a threshold voltage related to a maximum output voltage of the battery;
  a current output at a full power of the fuel cell assembly is less than or equal to a current capable of meeting a C rate of the battery when the battery is operating at its operational lower voltage limit,
wherein the fuel cell assembly comprises at least two fuel cells, each fuel cell in the fuel cell assembly having an anode and a cathode to provide for electrical interconnections with other fuel cells of the assembly or assembly output terminals wherein the electrical interconnections between a plurality of the fuel cells of the fuel cell assembly are configurable such that said plurality of the fuel cells or a subset thereof are connectable in at least two of;
  i) in series with another fuel cell of the assembly;
  ii) in parallel with another fuel cell of the assembly; or
  iii) disconnected from the assembly,
an electrical connection connects the fuel cells and the battery;
wherein the electrical connection includes a switch that comprises a cut-off switch and includes a hysteresis element to prevent a second switch event following a first switch event, in which the hysteresis element waits a predetermined period of time after the first switch event before allowing the second switch event, and in which the hysteresis element determines when the fuel cell voltage changes by a predetermined margin below the first threshold voltage after the first switch event before allowing the second switch event; and, wherein the fuel cell assembly includes a controller configured to actively reconfigure the interconnections in use.

10. A combination according to claim 9, in which the threshold voltage comprises a voltage 10% greater than a maximum output voltage of the battery.

11. A combination according to claim 9, in which the threshold voltage comprises a voltage equal to a maximum output voltage of the battery.

* * * * *